United States Patent [19]

Noland

[11] Patent Number: 5,233,744
[45] Date of Patent: Aug. 10, 1993

[54] IN SITE FLYWHEEL REPAIR APPARATUS

[76] Inventor: Edmund B. Noland, 205 Wildman St., NE., Leesburg, Va. 22075

[21] Appl. No.: 884,125

[22] Filed: May 18, 1992

Related U.S. Application Data

[62] Division of Ser. No. 639,296, Jan. 10, 1991, Pat. No. 5,140,737.

[51] Int. Cl.⁵ .............................................. B23P 23/04
[52] U.S. Cl. ................................ 29/566.1; 29/402.13; 29/402.16; 29/893.35; 29/DIG. 19; 51/5 R; 51/181 R
[58] Field of Search ............ 29/402.11, 402.13, 402.16, 29/281.1, 281.6, 467, 565, 566, DIG. 19, 893.3, 893.35, 527.4, 566.1; 51/3, 5 R, 5 F, 181 R, 235; 228/119, 215, 216

[56] References Cited

U.S. PATENT DOCUMENTS

| | | | |
|---|---|---|---|
| 3,230,668 | 1/1966 | Stanley | 51/5 F |
| 3,517,642 | 6/1970 | David | 51/5 F X |
| 3,755,877 | 9/1973 | Thompson | 29/402.13 |
| 3,849,944 | 11/1974 | Noll | 51/235 X |
| 4,285,108 | 8/1981 | Arrigoni | 29/402.13 X |

Primary Examiner—Mark Rosenbaum
Assistant Examiner—Peter Dungba Vo
Attorney, Agent, or Firm—Nixon & Vanderhye

[57] ABSTRACT

Method and apparatus are provided for repairing machine drive elements and particularly vehicle flywheels in situ. The apparatus includes a jig assembly mountable on a transmission housing and provided with a supporting surface including a slide mount assembly adapted to receive, in succession, welding and grinding tools for first building up a damaged or broken flywheel tooth, and then grinding the built-up tooth to original specifications. The slide mount assembly permits movement of the tools in two mutually perpendicular directions to permit alignment at the work site. The jig assembly also includes a turning gear designed to mesh with the flywheel for aligning a damaged or broken tooth at the work site.

21 Claims, 5 Drawing Sheets

IN SITE FLYWHEEL REPAIR APPARATUS

This is a division of application Ser. No. 07/639,296, filed Jan. 10, 1991 now U.S. Pat. No. 5,140,737.

BACKGROUND AND SUMMARY OF THE INVENTION

This invention relates generally to the repair and/or reconstruction of machine drive elements and, in one exemplary embodiment, to a unique method and apparatus for repairing broken or worn teeth on a vehicle flywheel without having to remove the flywheel from the vehicle.

Presently, in order to repair broken or worn teeth on a vehicle flywheel, it is necessary to disconnect the vehicle transmission, and remove the flywheel for repair at another location. This is a time consuming and costly process not only in terms of the repair of the vehicle itself, but also in terms of lost opportunities as a result of not having the vehicle available for use.

There are a number of methods and associated apparatus presently utilized in the repair and/or reconstruction of damaged or broken flywheel or other type gear teeth. For example, U.S. Pat. No. 3,668,768 discloses a method of rebuilding worn gear teeth by explosive swaging.

U.S. Pat. No. 3,739,892 discloses replacement of worn teeth in a transmission by the use of an annular replacement gear which is slipped over the worn teeth after they have been ground down to a smooth annulus.

U.S. Pat. No. 3,755,877 discloses a method of repairing used gear cutter wheels including the steps of removing portions of the old, used gear teeth and welding in place metal inserts which are then machined into final tooth, form.

U.S. Pat. No. 3,548,841 describes a method of rebuilding worn teeth on members such as gears, spline shafts, sprockets, and the like by building up the clearance side of the teeth and then grinding the wear out of the worn side, and the built up portion on the clearance side until the original teeth dimensions are obtained.

All of the above described conventional techniques suffer from the significant disadvantage of having to first remove the flywheel or other gear from their operational environment before such repairs can be implemented. Of course, these techniques also require reassembly of the flywheel or other type gear which further contributes to the time and cost involved in effecting such repairs.

The present invention eliminates the major disadvantage of the above described prior art techniques by permitting damaged flywheel teeth to be repaired while the flywheel remains in place on the vehicle.

Thus, in one exemplary embodiment of the invention, repair of damaged or broken flywheel teeth may be accomplished in the following manner. The vehicle is initially positioned over a conventional lift and elevated to a raised position providing easy access to the vehicle transmission. A dust shield bolted to the transmission housing is then removed by loosening and removing four small bolts which hold it in place. Upon removal of the dust shield, a portion of the flywheel is immediately visible and easily accessible. The flywheel ring gear is then inspected to confirm an initial diagnosis of damaged or broken teeth. Once this has been confirmed, a jig or frame in accordance with this invention is mounted to the transmission housing, utilizing the pre-existing bolt holes used to retain the dust shield in place.

The jig or frame is provided with a small gear rotated about an axis parallel to the axis of rotation of the flywheel, and which is rotatable by means of a conventional socket wrench. Upon mounting the jig or frame to the vehicle transmission housing, the small "motion gear" should be in good meshing engagement with a section of teeth on the flywheel which are not in need of repair. Once this meshing engagement has been confirmed, the flywheel may be rotated by means of the socket wrench in a clockwise direction until a damaged tooth is located directly in line with an indicator on the jig. At this point, a commercially available MIG welder may be mounted on an adjustable slide mount provided on the jig through the use of a slide adapted to be secured to the welder. The jig, slide mount and slide are configured so that the welder may be adjustably located at the precise location of the damaged or broken tooth on the flywheel. By pushing the MIG welder along the slide mount, i.e., in a direction parallel to the rotational axis of the flywheel, the damaged tooth is built up or reconstructed in a fairly coarse manner, in that material over and above that which is required to form the reconstructed tooth is added at the site.

The flywheel is then rotated in the clockwise direction until the next damaged tooth comes into alignment with the indicator and this tooth is also coarsely reconstructed with the MIG welder as described above. This procedure is repeated until all damaged teeth have been reconstructed. The MIG welder and associated slide area are then removed from the slide mount on the jig.

Thereafter, a commercially available right angle die grinder fitted with an appropriate router bit is engaged within the slide mount through the utilization of another slide adapted for use with the particular die grinder employed in the process. As in the case of the welder, adjustments are permitted to insure that the die grinder router bit is properly located to make a precise cut over the built-up tooth. Pushing the die grinder along the slide mount so that the router bit moves across the tooth, i.e., in the direction parallel to the rotational axis of the flywheel, results in a restructured tooth wherein the tooth and the space on either side of the tooth are restructured to original factory specifications.

Thereafter, the flywheel is rotated in a counterclockwise direction to the next successive built-up tooth and the grinding process is repeated. This process is then repeated until all damaged teeth have been machined to their original specifications. After shutting down the cutting oil supply means (a conventional pump, for example) and the die grinder and its associated slide are removed from the slide mount and the tool jig may be removed from the transmission housing.

Upon complete repair of all of the flywheel gear teeth, as described above, the vehicle can be started several times to insure that the starter and flywheel are working properly. The dust cover or dust shield may then be reattached to the transmission housing, and the vehicle removed from the lift to thereby complete the repair process.

The invention here also relates to a novel jig or frame assembly and associated components which permit the utilization of conventional tools to effect repair of damaged or broken flywheel teeth without having to remove the flywheel from the vehicle. It will be understood that the specific manner of attachment of the jig or frame to the vehicle is dependent upon the design of the transmission housing. Thus, it will be appreciated that the jig or frame will be adapted for use with specific vehicle transmission types, manufacturers, etc. The concept, however, is the same in that the jig or frame will always be designed for attachment to existing attachment points on the vehicle enabling in situ repair of the vehicle flywheel. It may be possible, for example, to mount the jig or frame so as to obtain access to the flywheel through the starter gear opening or from any other convenient point of access to the flywheel, such as, for example, a clutch or flywheel inspection opening typically provided in all large trucks and other heavy equipment. Regardless of the specific configuration of the jig or frame, in all cases there will be provided an adjustable slide mount to accommodate a welder and a die grinder, as well as the necessary conduits to supply a cutting lubricant or oil to the repair site.

Another feature of the invention relates to the provision of an air conduit for supplying cooling air to the site after welding or, in a vacuum mode, for removing debris from the site during grinding in the event a cutting oil or fluid is not used.

The jig is also provided with means for supplying cutting oil or other fluid to the die grinding site during grinding, and in this case, since the oil or fluid will carry away the debris, the above described vacuum need not be employed.

A further feature of the invention relates to the provision of a basin or tank for recovering the cutting fluid for subsequent filtration and recirculation.

Thus, in its broader aspects, the present invention provides in a preferred exemplary embodiment a method of repairing a worn or broken machine drive element in situ comprising the steps of: a) providing a jig adapted for mounting adjacent the machine drive element in need of repair, the jig having a supporting surface provided with an adjustable slide mount assembly for supporting in sequence, a welding tool and a die grinding tool; b) mounting the jig adjacent the machine drive element in need of repair without relocating the machine drive element from its operative environment; c) attaching a welding tool on the slide mount assembly; d) welding additional material to the drive element in excess of an amount required to repair the drive element; e) removing the welding tool from the slide mount assembly; f) mounting a grinding tool on the slide mount assembly; and g) grinding excess material from the drive element with a grinding bit adapted to provide a predetermined profile to the machine drive element.

The present invention also broadly provides repair apparatus for machine drive elements comprising a jig assembly including a tool supporting surface; an adjustable slide mount assembly secured to the supporting surface for adjustment in a first direction toward and away from the supporting surface; slide means adapted to move back and forth within the slide mount assembly in a second direction substantially perpendicular to the first direction, for supporting in succession a welding tool and a grinding tool, the adjustable slide mount assembly thereby enabling working elements of the welding and grinding tools to be accurately located at a site of repair on the machine drive element.

It will be understood from the above that the invention has general applicability to the repair and/or reconstruction of other machine drive elements in addition to the above described vehicle flywheels. For example, large gears typically utilized in propulsion systems, power generation equipment and the like, periodically require repair and/or reconstruction of included gearing which involves considerable downtime and cost. The present invention addresses these concerns by providing a mechanism which can be attached directly to the gear (in the case of very large gears) or to associated housings or the like, thereby eliminating the present requirement for disassembly and/or removal of such machine drive elements from their normal operative environment.

Another exemplary use for the subject invention is in assembly lines for the production of gears and the like where, again, repair and/or reconstruction can be carried out without having to remove the gear from the assembly line, thereby achieving significant savings in time and expense. Additional applications for the invention in military, industrial and aerospace fields will also be apparent to those of ordinary skill in the art.

Other objects and advantages of the subject invention will be apparent from the detailed description which follows.

DETAILED DESCRIPTION OF THE DRAWINGS

Figure 1:
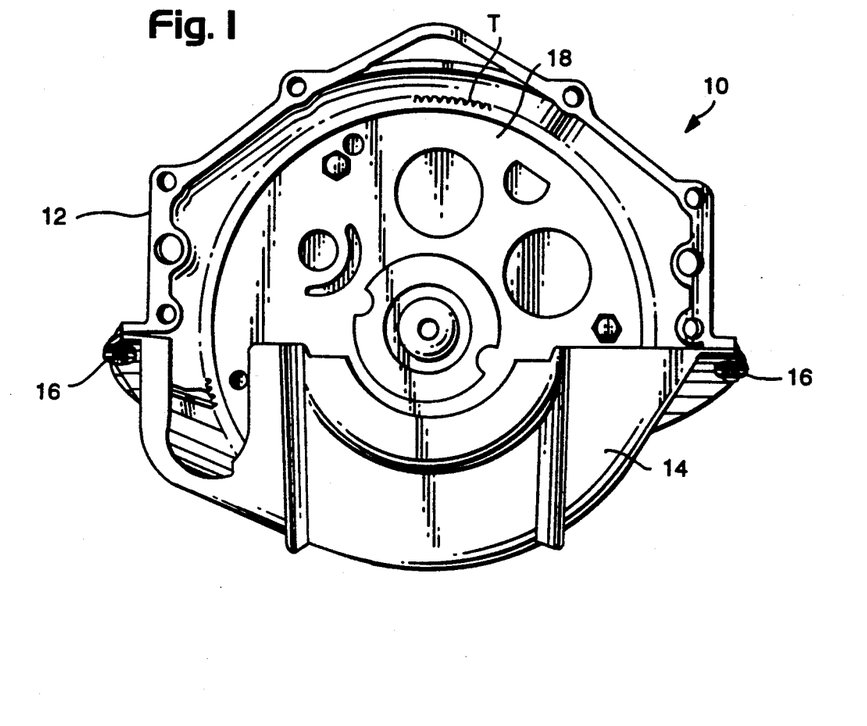
FIG. 1 is a front end view of a known transmission housing and associated flywheel.
Figure 2:
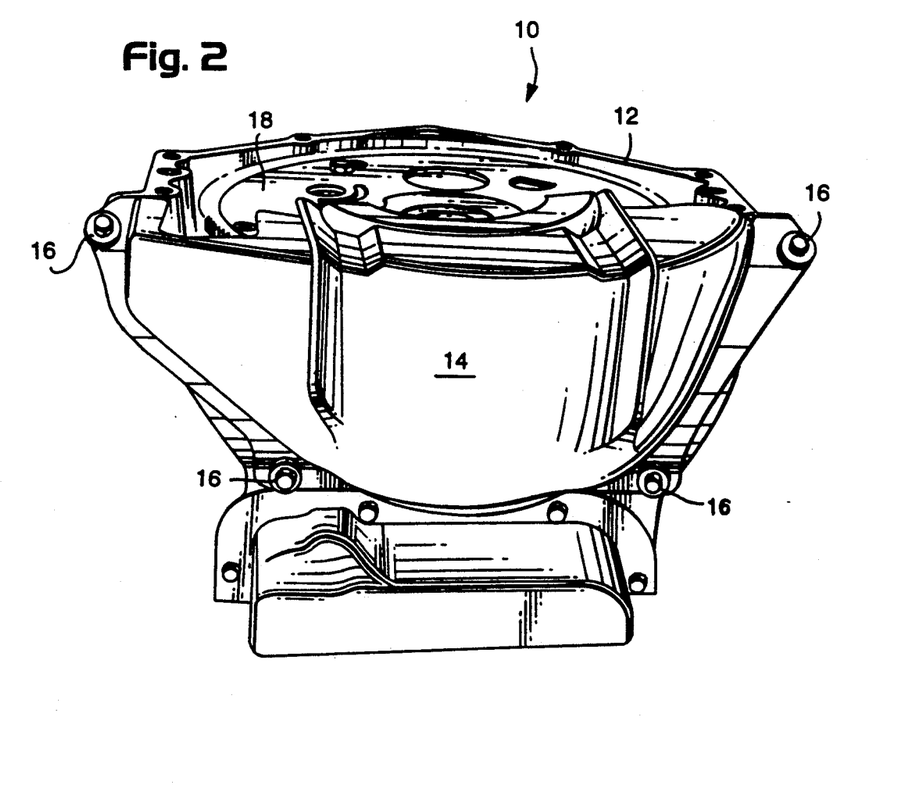
FIG. 2 is a lower perspective view of the transmission housing and associated flywheel shown in FIG. 1.

With reference now to FIGS. 1 and 2, a typical transmission assembly 10 (in this case, a General Motors Turbo Hydro-matic 350) includes a housing 12, and dust cover 14 which bolts to the forward end of the housing 12 via two pair of bolts threadably received in associated bolt holes shown generally at 16. A flywheel 18 is partially enclosed by the housing 12 and dust cover 14, but is located adjacent the dust cover 14 so that, upon removal of the latter, good access is provided to a portion of the periphery of the flywheel 18, even when the transmission housing is secured at both ends within the vehicle drive train. The transmission and associated flywheel are shown here removed from the vehicle merely for clarity. The flywheel 18 is provided with a plurality of gear teeth T about its periphery which are designed for meshing engagement with the teeth of a starter gear (not shown) mounted on the output shaft of a starter motor unit (also not shown).

Figure 3:
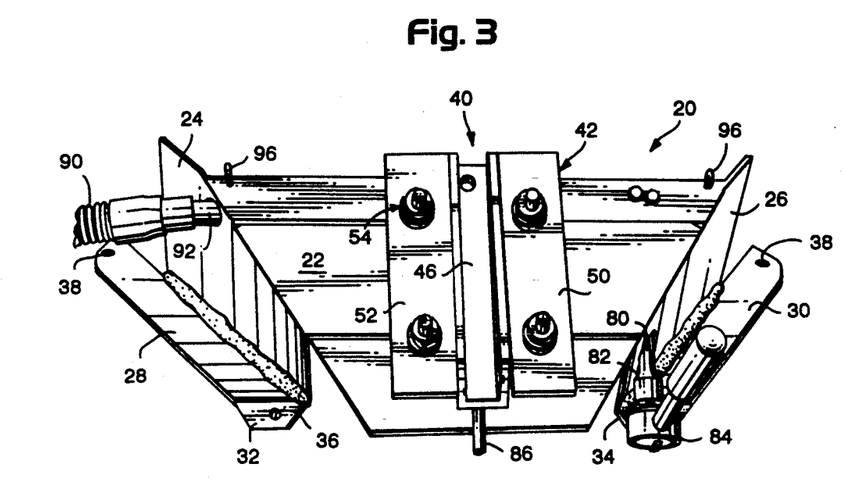
FIG. 3 is a perspective view of a jig assembly in accordance with the invention.
Figure 4:
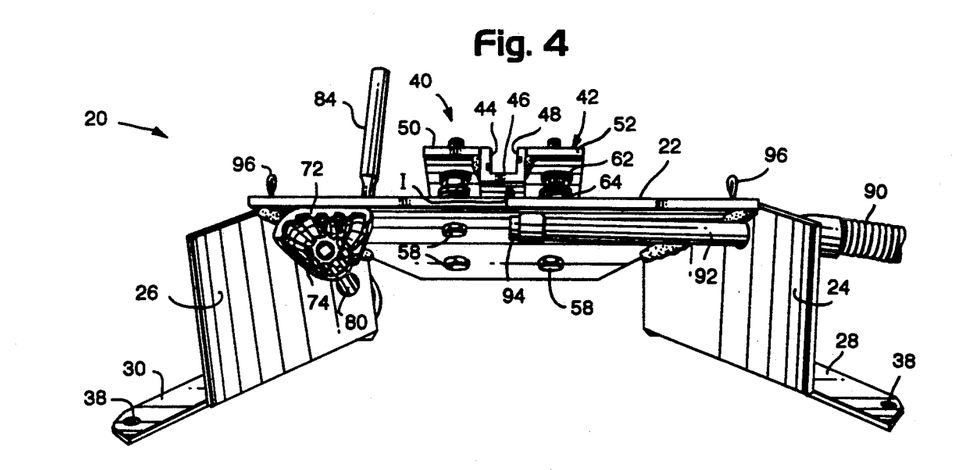
FIG. 4 is a front end view of the jig assembly illustrated in FIG. 3.
Figures 5, 6:
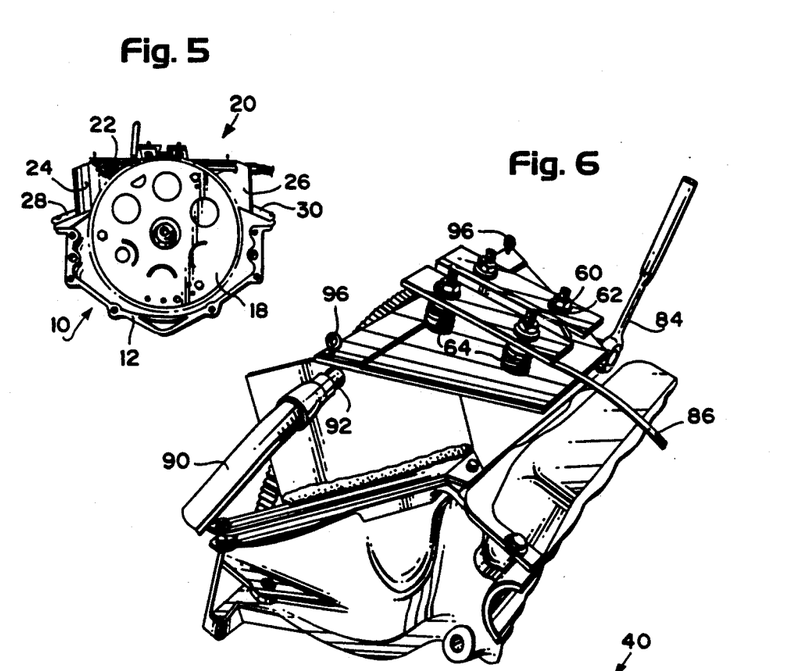
FIG. 5 is a front end view of the transmission housing and associated flywheel shown in FIG. 1, but with the transmission housing dust cover removed and the jig assembly illustrated in FIGS. 3 and 4 attached thereto.
FIG. 6 is a rear perspective view of the transmission housing with the jig assembly of FIGS. 3 and 4 attached thereto.

Turning now to FIGS. 3 and 4, a repair jig assembly 20 in accordance with an exemplary embodiment of the invention includes a main tool supporting surface 22, a pair of sidewalls 24, 26 and a pair of mounting flanges 28, 30 extending away from the lower ends of sidewalls 24, 26, respectively. At a narrower end of the support surface 22, flanges 28, 30 are formed with inclined mounting pads 32, 34 provided with bolt holes 36 (one shown in FIG. 3). At the wider end of support surface 22, flanges 28, 30 are provided with bolt holes 38. By so forming the jig, the latter may be mounted directly to the transmission housing 12 utilizing existing bolt holes in the housing normally used to mount the dust cover 14, and without having to disconnect or remove the transmission and/or flywheel from the vehicle drive train. The attachment of the jig assembly 20 to the transmission housing 12 is best seen in FIGS. 5 and 6, but it should be appreciated that the jig assembly and housing are shown inverted from their normal position on a vehicle for the sake of ease of understanding and clarity (this is also true of the orientation of FIGS. 7 through 10).

The jig assembly 20 as shown has been specifically configured for use with the above identified General Motors Turbo-Hydra-matic 350 transmission. For other transmissions, jig assemblies tailored to each would be provided, and the overriding design criteria is that the jib assembly be capable of mounting adjacent the flywheel to gain access to the latter without having to remove it (and/or the associated transmission) from its normal location within the vehicle drive train.

Located on the support surface 22 of the jig assembly 20 is a slide mount assembly 40 which includes a vertically adjustable tool support 42 having a centrally located U-shaped portion including surfaces 44, 46 and 48, with flanges 50, 52 extending away from upper ends of the surfaces 44, 48. The slide mount assembly 40 is attached to the support surface 22 by four identical bolt assemblies 54, best seen in FIGS. 6, 7, 9 and 10. Each bolt assembly 54 includes a bolt 56 (or threaded stud) projecting upwardly from under the support surface 22 shown at 58 in FIG. 4. The bolts 56 extend upwardly through unnumbered holes in flanges 50 or 52, with the flanges 50 and 52 supported and sandwiched by a pair of washer/nut assemblies 60, 62. In addition, coil springs 64 extend between surface 22 and the lower of the nuts 60, with additional washers 62 provided as engagement surfaces for the upper and lower ends of the springs. By rotating the nuts 60 in the appropriate sequence, as determined by the desired direction of movement of the slide mount 40, it will be appreciated that the slide mount may be raised or lowered relative to the main support surface 22, with coil springs 64 providing a resisting force in one direction and an urging force in an opposite direction to permit accurate and controlled movement of the slide mount assembly 40.

The U-shaped center portion of the slide mount assembly 40 is adapted to receive a slide 66 (see FIG. 3A) which is particularly adapted for pivotal connection to a welding tool via parallel mounting flanges 68 and pivot pin 69 as described further below.

Figure 3A:
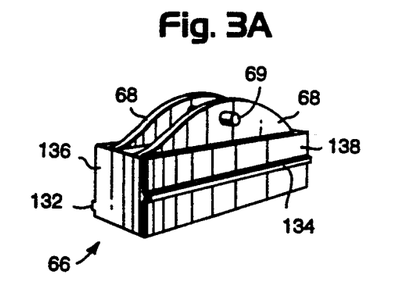
FIG. 3A is a perspective view of a first slide element for use with the jig assembly illustrated in FIG. 3.
Figure 3B:
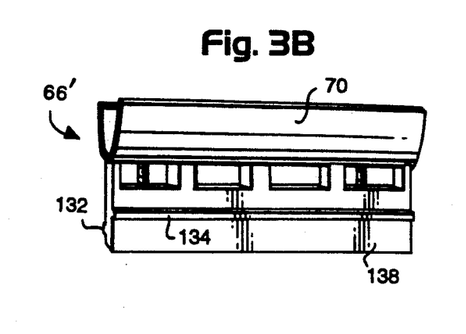
FIG. 3B is a perspective view of a second slide element for use with a jig assembly illustrated in FIG. 3.

Referring to FIG. 3B, a second slide 66' is shown which also comprises an elongated stock element, the upper surface of which secures a cradel 70 which is adapted to support a die grinding tool as also described below. The slides 66 and 66' enable the welding and die grinding tools to be temporarily secured to the slide mount assembly 40, and moved across the face of a damaged tooth in a direction parallel to the axis of rotation of the flywheel.

Figure 7:
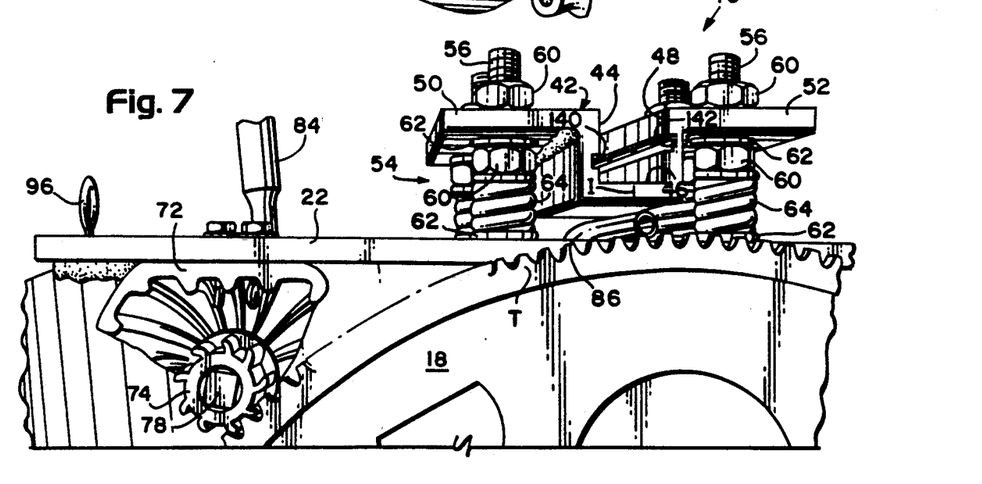
FIG. 7 is a partial enlarged frontal perspective of the jig assembly attached to the transmission housing.

With specific reference now to FIGS. 4 and 7, a shroud 72 is secured to the underside of surface 22, adjacent the sidewall 26. The shroud rotatably supports a gear 74 adapted to mesh with teeth T of the flywheel 18. Gear 74 is provided with a central bore 78 which receives the forward end of a shaft 80 rotatably mounted within the shroud 72. A rearward end of the shaft 80 extends through the sidewall 26 and terminates at a conventional socket 82 (see FIG. 3). By this arrangement, a socket wrench 84 may be attached to the socket 82 for rotating the shaft 80, along with gear 74. The gear 74 is located relative to the forward end of the jig assembly 20 such that, upon attachment of the jig assembly to the transmission housing 12, the gear 74 will be automatically placed in meshing engagement with the teeth T of the flywheel 18.

As best seen in FIGS. 6, 7, 9 and 10, a relatively small diameter, flexible tube 86 may be routed beneath the slide mount assembly 40 and fixed by one or more fasteners 88 to the support surface 22 in order to supply cutting oil or other fluid to the repair site during grinding as discussed further below.

Figure 9:
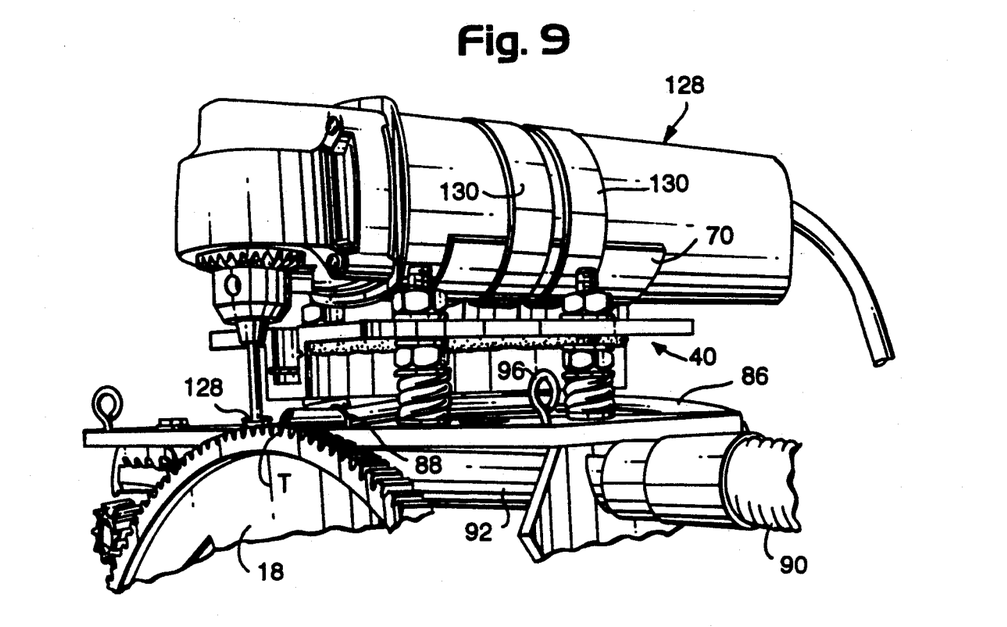
FIGS. 9 and 10 are perspective views of a die grinding tool mounted on the jig assembly and in alignment with teeth of a vehicle flywheel.

A relatively larger diameter, flexible air tube 90, best seen in FIGS. 4, 6 and 9, is provided with a relatively rigid forward portion 92 which extends through a forward end of sidewall 24 beneath support surface 22, with a free discharge end 94 of the tube located directly beneath the center U-shaped portion of the slide mount assembly 40 adjacent the welding or grinding tool heads, depending on which is in use at the time. Air tube 90 may be use to 1) supply cooling air to the site immediately after welding; or 2) supply a vacuum to the site during grinding (if cutting oil is not used) to remove debris from the site.

Figure 11:
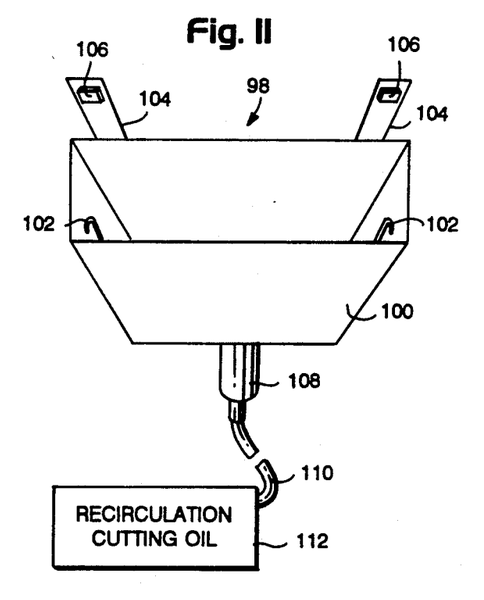
FIG. 11 is a perspective view of a fluid collection filtering and recirculation unit for use with the jig assembly.

A pair of screw eyes 96 are mounted on the support surface 22 adjacent the forward end thereof to facilitate attachment of a recovery unit 98 (FIG. 11) which permits a recovery and recycling of cutting oil discharge form tube 86. The unit 98 includes a basin or tank 100 which may be constructed of double stitched canvas, plastic or other suitable material. At the upper, open end of the base in tank 100, a pair of hooks 102 are secured for engagement with the screw eyes 96 provided on supporting surface 22. Attachment straps 104 are provided on an opposite side of the basin or tank 100, with magnets 106 fixed thereto so as to allow attachment to any convenient metal surface, such as the transmission casing 12. The bottom of the basin or tank 100 is provided with a drain opening communicating with a filter 108 which, in turn, is connected to a conduit 110 which filtered the cutting oil or other fluid to a recirculation unit 112, including a conventional pump (not shown).

Figure 8:
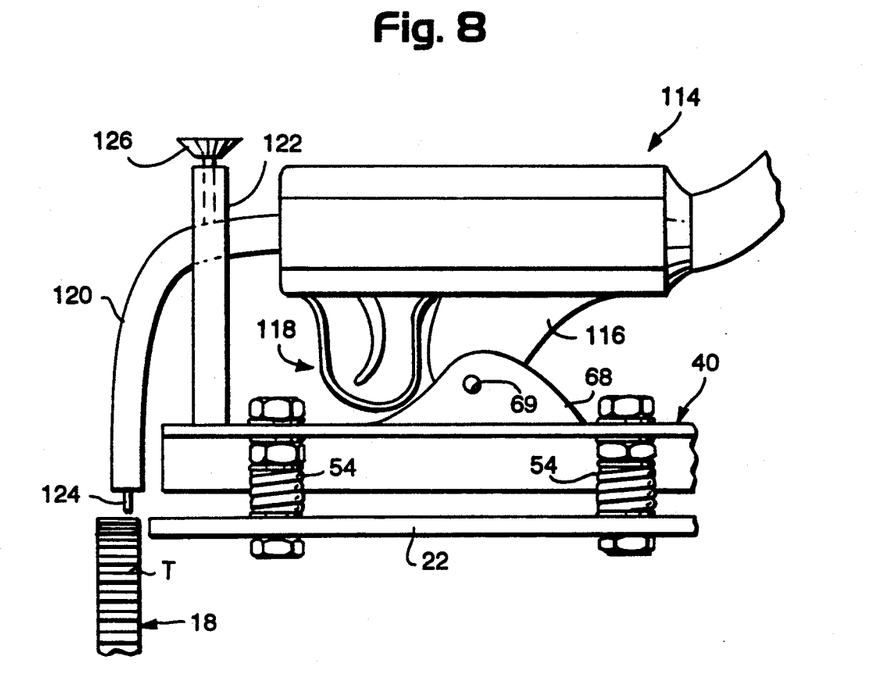
FIG. 8 is a partial side elevation illustrating a welding tool mounted on the jig assembly and in alignment with the teeth of a vehicle flywheel.

Referring now to FIGS. 3A and 8, a MIG welding tool 114 is shown mounted to the slide mount assembly 40, and specifically, pivotally supported on the slide 66 by means of the upstanding flanges 68 and pivot pin 69 which passes through a flange 116 located behind a trigger 118 of the welder 114 and which is secured at either end by any suitable means within the flanges 68. A presently preferred welder for use in this invention is a Lincoln Electric IDEALARC®, model SP150. While the welder need not be described in detail, it is nevertheless pointed out that the welder has a snout 120 adapted to deposit welding material at a desired location upon activation of the tool via trigger 118. An adjustment mechanism 122 permits fine adjustment of the discharge orifice 124 via rotation of the knob 126 which, in one direction of rotation, tilts the forward end of the welder 114 downwardly about the pivot pin 69 against the resistive action of a coil spring (not shown) located within the mechanism 122, below the snout 120. Rotation of the knob 126 in the opposite direction will pivot the forward end of the welder upwardly via the urging action of the coil spring.

Figure 10:
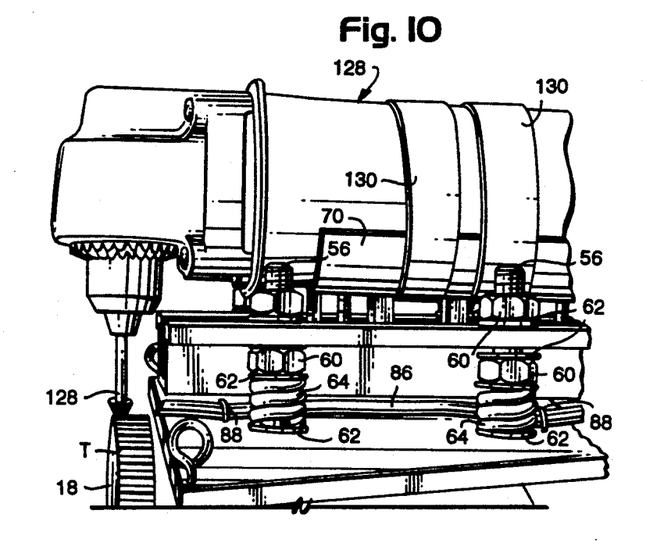

Referring to FIGS. 3B, 9 and 10, a second slide 66' is shown, to which is secured the cradel element 70 which supports a right angle die grinder 128 by means of straps 130. A preferred die grinder 126 is a Florida Universal Tool 90° Angle Head Grinder, model no. FP 259R, fitted with a suitable router bit 128 designed to grind the built-up teeth to original specifications in a manner fully understood by those skilled in the art. This is an air powered grinder, but it will be appreciated that electric die grinders may also be employed, a suitable one being the Precise S45 Grinder from Precise High Speed Spindle Systems.

As best seen in FIGS. 3A and 3B, both slides 66 and 66' may be provided with a pair of offset axial projections 132, 134 extending along oppositely facing sidewalls 136, 138 of the respective slides, and which are adapted to be received in corresponding grooves 140 and 142 (see especially FIG. 7) provided within the surfaces 44 and 48 of the U-shaped channel portion of slide mount assembly 40. In this way, the welding and grinding tools will be retained within the slide mount assembly 40 during their respective operations. This is particularly advantageous since, as noted above, the tools are substantially inverted from the positions shown in FIGS. 8-10 when attached to a vehicle flywheel housing.

The use of the above described jig assembly 20 and associated welding and grinding tools 114, 126, respectively, will now be described in terms of a repair procedure relating to broken or damaged teeth T on the flywheel 18 of a vehicle. This particular use of the invention is exemplary only, and the invention is not limited to this particular use, but rather, may be adapted for a variety of other repair procedures involving machine drive elements in general as noted hereinabove.

After the vehicle has been raised on a conventional lift, the transmission dust cover 14 is removed to thereby provide easy access to the flywheel 18. The jib assembly 20 is thereafter secured to the transmission housing 12, utilizing the bolt holes normally used to secure the dust cover 14 to the transmission housing. In the process of mounting the jig assembly 20 to the transmission housing 12, the turning gear 74 meshes with the flywheel 18. This permits the flywheel to be rotated by means of the socket wrench 84 so that a broken or damaged tooth T of the flywheel can be aligned with an indicator I (FIGS. 4 and 7) provided on the jib assembly, at a location where the tooth to be repaired will also be precisely aligned with the discharge orifice 124 of the grinding tool 114.

The MIG welding tool 114 with slide 66 fixed thereto by means of flanges 68 and pivot pin 69 is then slidably engaged within the slide mount assembly 40. Nut and bolt assemblies 54 and the welding tool adjustment mechanism 122 may then be adjusted as required in order to permit the snout 120 of the welding tool to be properly aligned adjacent and directly above the damaged or broken tooth T. Once the welding tool 114 has been properly aligned, a mass of metal material may be deposited across the broken or damaged tooth while the welding tool is moved along the U-shaped portion of the slide mount assembly 40. Immediately after the metal deposit, air may be supplied to the site via air conduit 90 in order to cool the built-up tooth. This procedure is carried out for each damaged or broken tooth on the flywheel 18 and the welding tool 114 is thereafter removed from the slide mount assembly 40.

Using the second slide 66' attached to the die grinder 128, the latter may be slidably received within the slide mount assembly 40 and, again, adjustments are made as required, via nut and bolt assemblies 54, in order to properly align the router bit 128 of the die grinder 128 with a broken or damaged tooth which has now been built up with additional metal material supplied by the welder 114.

For each built-up tooth, the die grinder 128 is moved across the tooth as it slides within the slide mount assembly 40 to thereby grind the built-up tooth to original factory specifications. During the die grinding step, cutting oil or other fluid may be supplied to the work site or the site of repair by means of the flexible tube 86. The cutting oil or fluid is collected within the basin or tank 100, filtered through the filter 108 and returned to the recirculation unit 112. In the event a cutting oil or fluid is not employed, debris from the grinding operation may be removed from the work site by applying a vacuum through the air tube 90.

After all of the broken and/or damaged flywheel teeth have been repaired, the vehicle may be started several times to insure that the starter and flywheel are working properly. Thereafter, the dust cover 14 is reattached to the transmission housing 12 and the vehicle removed from the lift to thereby complete the repair process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Repair apparatus for repairing machine drive elements in situ comprising a repair tool jig assembly including a supporting surface; an adjustable slide mount assembly secured to said supporting surface for adjustment in a first direction toward and away from said supporting surface; slide means adapted to move back and forth within the slide mount assembly in a second direction substantially perpendicular to said first direction, for supporting in succession a welding repair tool and a grinding repair tool, said adjustable slide mount assembly thereby enabling said slide means and working elements of said welding and grinding repair tools to be accurately located at a side of repair on said machine drive element.

2. Repair apparatus according to claim 1 and including a fluid supply conduit extending to said site of repair.

3. Repair apparatus according to claim 1 and including an air conduit extending to said site of repair.

4. Repair apparatus according to claim 3 wherein said air conduit is adapted to draw a vacuum at the site of repair.

5. Repair apparatus according to claim 3 wherein said air conduit is adapted to supply cooling air to the site of repair.

6. Repair apparatus for repairing machine drive elements in situ comprising a repair tool jig assembly including a supporting surface; an adjustable slide mount assembly secured to said supporting surface for adjustment in a first direction toward and away from said supporting surface; slide means adapted to move back and forth within the slide mount assembly in a second direction substantially perpendicular to said first direction, for supporting in succession a welding repair tool and a grinding repair tool, said adjustable slide mount assembly thereby enabling said slide means and working elements of said welding and grinding repair tools to be accurately located at a site of repair on said machine drive element; wherein said slide mount assembly includes a substantially U-shaped channel and a pair of flanges extending in opposite directions from upper edges of the substantially U-shaped channel.

7. Repair apparatus according to claim 6 wherein said slide mount assembly is adjustable toward and away from said tool supporting surface by means of a plurality of nut and bolt assemblies connected between the supporting surface and said pair of flanges.

8. Repair apparatus according to claim 7 wherein each nut and bolt assembly includes a pair of nuts threadably secured to a respective bolt, one nut on either side of a respective one of said flanges, and a coil spring received over each bolt between the nut underlying the respective flange and said supporting surface.

9. Repair apparatus according to claim 6 and further including a first slide mount for the welding tool and a second slide mount for the grinding tool, said first and second slide mounts enabling said welding and sliding tools to be slidably received, in succession, within said substantially U-shaped channel.

10. Repair apparatus according to claim 9 wherein said second slide mount is adapted for pivotal connection to said grinding tool.

11. Repair apparatus for repairing machine drive elements in situ comprising a repair tool jig assembly including a supporting surface; an adjustable slide mount assembly secured to said supporting surface for adjustment in a first direction toward and away from said supporting surface; slide means adapted to move back and forth within the slide mount assembly in a second direction substantially perpendicular to said first direction, for supporting in succession a welding repair tool and a grinding repair tool, said adjustable slide mount assembly thereby enabling said slide means and working elements of said welding and grinding repair tools to be accurately located at a site of repair on said machine drive element; wherein the machine drive element comprises a flywheel provided with a plurality of teeth formed about the periphery thereof, said jig assembly further including a turning gear for meshing engagement with said teeth on said flywheel.

12. Repair apparatus according to claim 11 wherein means are provided for rotating said turning gear in order to align a predetermined one of said teeth with an indicator on said jig assembly.

13. Flywheel repair apparatus for repairing and/or reconstructing a damaged or broken tooth on a vehicle flywheel without having to remove the flywheel from the vehicle, the apparatus comprising: a jig assembly including a supporting surface and a pair of mounting flanges adapted to permit said jig assembly to be secured to existing mounting locations provided on a transmission housing partially enclosing the flywheel; said tool supporting surface having a slide mount assembly adjustably secured thereto; a welding tool adapted for temporary securement to said slide mount assembly; and a grinding tool adapted for temporary securement to said slide mount assembly upon removal of said welding tool; said slide mount assembly including means for aligning said tools at a work site adjacent a tooth to be repaired in directions parallel and perpendicular to an axis of rotation of said flywheels, and wherein said jib assembly is provided with a turning gear adapted to mesh with teeth of the flywheel upon securement of said jib assembly to said transmission housing, said turning gear being connected to a means for rotating said turning gear to thereby enable one of said damaged or broken flywheel teeth to be aligned with said work site.

14. Flywheel repair apparatus according to claim 13 wherein said slide mount assembly includes first and second slide elements provided with means for securing said welding and grinding tools, respectively, thereto, said first and second slide elements being adapted for sliding engagement with said slide mount assembly to thereby enable said welding said grinding tools to be moved toward and away from said work site in said parallel direction.

15. Repair apparatus according to claim 13 and including a fluid supply conduit extending to said work site.

16. Repair apparatus according to claim 15 and including means for collecting, filtering and recycling said fluid.

17. Repair apparatus according to claim 16 wherein said means includes a collector tank detachably secured to said jig assembly, said tank provided with a filter for removing debris from said lubricating fluid, and a conduit for carrying filtered lubricating fluid to a recycling unit.

18. Repair apparatus according to claim 13 and including an air conduit extending to said work site.

19. Repair apparatus according to claim 18 wherein said air conduit is adapted to draw a vacuum at the work site.

20. Repair apparatus according to claim 18 wherein said air conduit is adapted to supplying cooling air to the work site.

21. Repair apparatus according to claim 18 wherein said slide mount assembly is adjustable in said perpendicular direction by a plurality of nut and bolt assemblies connected between the supporting surface and said slide mount assembly.

* * * * *